(12) United States Patent
Lakshmi Narayanan et al.

(10) Patent No.: US 11,514,319 B2
(45) Date of Patent: Nov. 29, 2022

(54) ACTION PREDICTION

(71) Applicant: Honda Motor Co., Ltd., Tokyo (JP)

(72) Inventors: Athmanarayanan Lakshmi Narayanan, Sunnyvale, CA (US); Behzad Dariush, San Ramon, CA (US); Behnoosh Parsa, Seattle, WA (US)

(73) Assignee: HONDA MOTOR CO., LTD., Tokyo (JP)

( * ) Notice: Subject to any disclaimer, the term of this patent is extended or adjusted under 35 U.S.C. 154(b) by 408 days.

(21) Appl. No.: 16/851,050

(22) Filed: Apr. 16, 2020

(65) Prior Publication Data
US 2021/0081782 A1 Mar. 18, 2021

Related U.S. Application Data (60) Provisional application No. 62/901,208, filed on Sep. 16, 2019.

(51) Int. Cl.
| | |
|---|---|
| *G06N 3/08* | (2006.01) |
| *G06N 3/04* | (2006.01) |
| *G06F 16/909* | (2019.01) |
| *G06F 16/901* | (2019.01) |
| *G06K 9/62* | (2022.01) |
| *G06V 20/64* | (2022.01) |

(52) U.S. Cl.
CPC ............. *G06N 3/08* (2013.01); *G06F 16/909* (2019.01); *G06F 16/9024* (2019.01); *G06K 9/6288* (2013.01); *G06N 3/0454* (2013.01); *G06V 20/64* (2022.01)

(58) Field of Classification Search
None
See application file for complete search history.

(56) References Cited

U.S. PATENT DOCUMENTS

2020/0394499 A1* 12/2020 Yao ..................... G06N 3/0454

OTHER PUBLICATIONS

Li et al. ("Actional-Structural Graph Convolutional Networks for Skeleton-Based Action Recognition", Proceedings of the IEEE/CVF Conference on Computer Vision and Pattern Recognition (CVPR), Jun. 16-20, 2019, pp. 3595-3603) (Year: 2019).*
S. Bai, J. Z. Kolter, and V. Koltun. An empirical evaluation of generic convolutional and recurrent networks for sequence modeling. arXiv preprint arXiv:1803.01271, 2018.

(Continued)

*Primary Examiner* — Leon Viet Q Nguyen
(74) *Attorney, Agent, or Firm* — Rankin, Hill & Clark LLP (57) ABSTRACT

According to one aspect, action prediction may be implemented via a spatio-temporal feature pyramid graph convolutional network (ST-FP-GCN) including a first pyramid layer, a second pyramid layer, a third pyramid layer, etc. The first pyramid layer may include a first graph convolution network (GCN), a fusion gate, and a first long-short-term-memory (LSTM) gate. The second pyramid layer may include a first convolution operator, a first summation operator, a first mask pool operator, a second GCN, a first upsampling operator, and a second LSTM gate. An output summation operator may sum a first LSTM output and a second LSTM output to generate an output indicative of an action prediction for an inputted image sequence and an inputted pose sequence.

20 Claims, 8 Drawing Sheets

(56) References Cited

OTHER PUBLICATIONS

Z. Cao, G. Hidalgo, T. Simon, S.-E. Wei, and Y. Sheikh. OpenPose: realtime multi-person 2D pose estimation using Part Affinity Fields. arXiv preprint arXiv:1812.08008, 2018.

J. Carreira and A. Zissemnan. Quo vadis, action recognition? a new model and the kinetics dataset. In proceedings of the IEEE Conference on Computer Vision and Pattern Recognition, pp. 6299-6308, 2017.

A. Colim, P. Carneiro, N. Costa, P. M. Arezes, and N. Sousa. Ergonomic assessment and workstation design in a furniture manufacturing industrya case study. In Occupational and Environmental Safety and Health, pp. 409-417. Springer, 2019.

Y. Du, W. Wang, and L. Wang. Hierarchical recurrent neural network for skeleton based action recognition. In Proceedings of the IEEE conference on computer vision and pattern recognition, pp. 1110-1118, 2015.

U. Gaur, Y. Zhu, B. Song, and A. Roy-Chowdhury. A string of feature graphs model for recognition of complex activities in natural videos. In 2011 International Conference on Computer Vision, pp. 2595-2602. IEEE, 2011.

K. He, X. Zhang, S. Ren, and J. Sun. Deep residual learning for image recognition. In Proceedings of the IEEE conference on computer vision and pattern recognition, pp. 770-778, 2016.

S. Hignett and L. McAtamney. Rapid entire body assessment. In Handbook of Human Factors and Ergonomics Methods, pp. 97-108. CRC Press, 2004.

H. Idrees, A. R. Zamir, Y.-G. Jiang, A. Gorban, I. Laptev, R. Sukthankar, and M. Shah. The THUMOS challenge on action recognition for videos in the wild. Computer Vision and Image Understanding, 155:1-23, 2017.

S. Kim, K. Yun, J. Park, and J. Y. Choi. Skeleton-based action recognition of people handling objects. In 2019 IEEE Winter Conference on Applications of Computer Vision (WACV), pp. 61-70. IEEE, 2019.

T. N. Kipf and M. Welling. Semi-supervised classification with graph convolutional networks. arXiv preprint arXiv:1609.02907, 2016.

H. Kuehne, H. Jhuang, E. Garrote, T. Poggio, and T. Serre. HMDB: a large video database for human motion recognition In 2011 International Conference on Computer Vision, pp. 2556-2563. IEEE, 2011.

C. Lea, M. D. Flynn, R. Vidal, A. Reiter, and G. D. Hager. Temporal convolutional networks for action segmentation and detection. In proceedings of the IEEE Conference on Computer Vision and Pattern Recognition, pp. 156-165, 2017.

I. Lee, D. Kim, S. Kang, and S. Lee. Ensemble deep learning for skeleton-based action recognition using temporal sliding lstm networks. In Proceedings of the IEEE International Conference on Computer Vision, pp. 1012-1020, 2017.

M. Li, S. Chen, X. Chen, Y. Zhang, Y. Wang, and Q. Tian. Actional-structural graph convolutional networks for skeleton-based action recognition. In Proceedings of the IEEE Conference on Computer Vision and Pattern Recognition, pp. 3595-3603, 2019.

Y. Li, C. Lan, J. Xing, W. Zeng, C. Yuan, and J. Liu. Online human action detection using joint classification-regression recurrent neural networks. In European Conference on Computer Vision, pp. 203-220. Springer, 2016.

C. Liu, Y. Hu, Y. Li, S. Song, and J. Liu. Pku-mmd: A large scale benchmark for continuous multi-modal human action understanding. arXiv preprint arXiv:1703.07475, 2017.

J. Liu, A. Shahroudy, G. Wang, L.-Y. Duan, and A. C. Kot. SSNet: scale selection network for online 3D action prediction. In Proceedings of the IEEE Conference on Computer Vision and Pattern Recognition, pp. 8349-8358, 2018.

J. Liu, G. Wang, P. Hu, L.-Y. Duan, and A. C. Kot. Global context-aware attention LSTM networks for 3D action recognition. In Proceedings of the IEEE Conference on Computer Vision and Pattern Recognition, pp. 1647-1656, 2017.

B. Parsa, E. U. Samani, R. Hendrix, C. Devine, S. M. Singh, S. Devasia, and A. G. Banerjee. Toward ergonomic risk prediction via segmentation of indoor object manipulation actions using spatiotemporal convolutional networks. IEEE Robotics and Automation Letters, 4(4):3153-3160, 2019.

L. Peppoloni, A. Filippeschi, E. Ruffaldi, and C. Avizzano. A novel wearable system for the online assessment of risk for biomechanical load in repetitive efforts. International Journal of Industrial Ergonomics, 52:1-11, 2016.

G. Possebom, A. dos Santos Alonc,o, S. D. C. Bellochio, T. G. Lopes, D. P. Carpes, R. S. Becker, A. R. Moreira, T. R. Francetto, F. P. Rossato, and B. C. C. R. Zart. Comparison of methods for postural assessment in the operation of agricultural machinery. Journal of Agricultural Science, 10(9), 2018.

G. Rogez, P. Weinzaepfel, and C. Schmid. Lcr-net: Localization-classification-regression for human pose. In Proceedings of the IEEE Conference on Computer Vision and Pattern Recognition, pp. 3433-3441, 2017.

A. S. J. Roodbandi, F. Ekhlaspour, M. N. Takaloo, and S. Farokhipour. Prevalence of musculoskeletal disorders and posture assessment by qec and inter-rater agreement in this method in an automobile assembly factory: Iran-2016. In Congress of the International Ergonomics Association, pp. 333-339. Springer, 2018.

Z. Shou, D. Wang, and S.-F. Chang. Temporal action localization in untrimmed videos via multi-stage cnns. In Proceedings of the IEEE Conference on Computer Vision and Pattern Recognition, pp. 1049-1058, 2016.

A. Shrivastava, A. Gupta, and R. Girshick. Training region-based object detectors with online hard example mining. In Proceedings of the IEEE conference on computer vision and pattern recognition, pp. 761-769, 2016.

C. Si, W. Chen, W. Wang, L. Wang, and T. Tan. An attention enhanced graph convolutional lstm network for skeleton-based action recognition. In Proceedings of the IEEE Conference on Computer Vision and Pattern Recognition, pp. 1227-1236, 2019.

A. K. Singh, M. Meena, H. Chaudhary, and G. Dangayach. Ergonomic assessment and prevalence of musculoskeletal disorders among washer-men during carpet washing: guidelines to an effective sustainability in workstation design. International Journal of Human Factors and Ergonomics, 5(1):22-43, 2017.

G. Singh, S. Saha, M. Sapienza, P. H. Torr, and F. Cuzzolin. Online real-time multiple spatiotemporal action localisation and prediction. In Proceedings of the IEEE International Conference on Computer Vision, pp. 3637-3646, 2017.

K. Soomro, A. R. Zamir, and M. Shah. UCF101: A dataset of 101 human actions classes from videos in the wild. arXiv preprint arXiv:1212.0402, 2012.

W. Sultani and M. Shah. What If We Do Not Have Multi-ple Videos of the Same Action?—Video Action Localization Using Web Images. In Proceedings of the IEEE Conference on Computer Vision and Pattern Recognition, pp. 1077-1085, 2016.

M. Tenorth, J. Bandouch, and M. Beetz. The TUM kitchen data set of everyday manipulation activities for motion tracking and action recognition. In IEEE Int. Conf. Comput. Vis. Workshops, pp. 1089-1096, 2009.

D. Tran, L. Bourdev, R. Fergus, L. Torresani, and M. Paluri. Learning spatiotemporal features with 3d convolutional networks. In Proceedings of the IEEE international conference on computer vision, pp. 4489-4497, 2015.

D. Tran, H. Wang, L. Torresani, J. Ray, Y. LeCun, and M. Paluri. A closer look at spatiotemporal convolutions for action recognition. In Proceedings of the IEEE conference on Computer Vision and Pattern Recognition, pp. 6450-6459, 2018.

Z. Wu, S. Pan, F. Chen, G. Long, C. Zhang, and P. S. Yu. A comprehensive survey on graph neural networks. arXiv preprint arXiv:1901.00596, 2019.

S. Yan, Y. Xiong, and D. Lin. Spatial temporal graph convolutional networks for skeleton-based action recognition. In Thirty-Second AAAI Conference on Artificial Intelligence, 2018.

P. Zhang, C. Lan, J. Xing, W. Zeng, J. Xue, and N. Zheng. View adaptive recurrent neural networks for high performance human action recognition from skeleton data. In Proceedings of the IEEE International Conference on Computer Vision, pp. 2117-2126, 2017.

(56) References Cited

OTHER PUBLICATIONS

H. Zhao, M. Tian, S. Sun, J. Shao, J. Yan, S. Yi, X. Wang, and X. Tang. Spindle net: Person re-identification with human body region guided feature decomposition and fusion. In Proceedings of the IEEE Conference on Computer Vision and Pattern Recognition, pp. 1077-1085, 2017.

Y. Zhao, Y. Xiong, and D. Lin. Recognize actions by disentangling components of dynamics. In Proceedings of the IEEE Conference on Computer Vision and Pattern Recognition, pp. 6566-6575, 2018.

J. Zhou, G. Cui, Z. Zhang, C. Yang, Z. Liu, and M. Sun. Graph neural networks: A review of methods and applications. arXiv preprint arXiv:1812.08434, 2018.

\* cited by examiner

| Algorithm 1 Feature Update Rule |
|---|
| $x_0 \leftarrow x$ ▷ input skeleton distributed over time <br> $k \leftarrow 1$ ▷ iterator <br> while $k \leq 3$ do <br>      $f_k = c_k(x_{k-1})$ ▷ GCN operation <br>      $x_k = \begin{cases} g_k(f_k) & \text{if } k < 3, \\ None. & \text{otherwise.} \end{cases}$ ▷ GAP operation <br>      $k = k+1$ <br> The following $f_k \forall k \in (1, 2, 3)$ are used as input features for the feature pyramid operations in algorithm 2 |

| Algorithm 2 Pyramid Update Rule |
|---|
| $k \leftarrow 1$ ▷ iterator <br> while $k \leq 3$ do <br>      $p_k = \begin{cases} w_k \otimes f_k & \text{if } k < 3, \\ f_k & \text{otherwise.} \end{cases}$ ▷ $1 \times 1$ convolution <br>      $z_k = \begin{cases} p_k \otimes u_k(p_k-1) & \text{if } k < 3, \\ p_k & \text{otherwise.} \end{cases}$ <br>      ▷ Upsample & Add <br> $k = k+1$ <br> The following $Z_k \forall k \in (1, 2, 3)$ are used as input features for the temporal medelling using three seperate LSTMs |

Table 1. Legends used in Algorithm

| Symbol | Legend |
|---|---|
| $x$ | input feature to GCN |
| $c_k$ | GCN |
| $g_k$ | GAP |
| $f_k$ | output feature of GCN |
| $w_k$ | $1 \times 1$ convolution |
| $u_k$ | upsampling and add |
| $p_k$ | output of $1 \times 1$ convolution |
| $Z_k$ | final features |

ACTION PREDICTION

CROSS-REFERENCE TO RELATED APPLICATIONS

This application claims the benefit of U.S. Provisional Patent Application, Ser. No. 62/901,208 entitled SPATIO-TEMPORAL PYRAMID GRAPH CONVOLUTION FOR HUMAN ACTION PREDICTION, filed on Sep. 16, 2019; the entirety of the above-noted application(s) is incorporated by reference herein.

BACKGROUND

Work-related musculoskeletal disorders may be one of the main reasons for early retirement and may be common in many occupations. Therefore, many studies try to analyze the ergonomic risk for workers involved in a manufacturing process. Workers may engage in repetitive tasks and therefore, traditional monitoring may be not sufficient to guarantee efficiency. Hence, human action recognition has attracted the attention of many industries, which plays an important role in human-robot interaction and performance monitoring.

BRIEF DESCRIPTION

According to one aspect, a system for action prediction may include a first pyramid layer, a second pyramid layer, and an output summation operator. The first pyramid layer may include a first graph convolution network (GCN). The second pyramid layer may include a second GCN. The first pyramid layer may receive an image sequence and a pose sequence and fuses information associated with the image sequence with information associated with the pose sequence to generate a fusion output. The first pyramid layer may be associated with a model having a first number of nodes and may generate a first pyramid layer output. The second pyramid layer may be associated with a second model having a second number of nodes and may generate a second pyramid layer output. The output summation operator may sum the first pyramid layer output and the second pyramid layer output to generate an output indicative of an action prediction for the image sequence and the pose sequence.

The first pyramid layer and the second pyramid layer may be arranged as a spatio-temporal feature pyramid graph convolutional network (ST-FP-GCN). A fusion gate of the first pyramid layer may fuse information associated with the image sequence with information associated with the pose sequence to generate the fusion output. The first pyramid layer may include an object recognition convolutional network. The object recognition convolutional network may be a visual geometry group (VGG) network. The second number of nodes may be less than the first number of nodes. During a training phase, a first LSTM output of a first long-short-term-memory (LSTM) gate of the first pyramid layer may represent a first loss and a second LSTM output of a second LSTM of the second pyramid layer may represent a second loss. A first weight associated with the first GCN may be adjusted based on the first loss and a second weight associated with the second GCN may be adjusted based on the second loss. A first convolution operator of the second pyramid layer may perform a 1×1 convolution function. The model and the second model may be human skeleton models.

According to one aspect, a method for action prediction may include receiving an image sequence and a pose sequence and fusing information associated with the image sequence with information associated with the pose sequence to generate a fusion gate output, feeding the fusion gate output to a first long-short-term-memory (LSTM) gate to generate a first LSTM output, feeding the pose sequence to a first graph convolution network (GCN) of a first pyramid layer to generate a first GCN output feature, feeding the first GCN output feature to a second GCN of a second pyramid layer to generate a second GCN output feature, feeding the second GCN output feature to a second LSTM gate to generate a second LSTM output, and summing the first LSTM output and the second LSTM output to generate an output indicative of an action prediction for the image sequence and the pose sequence.

The first GCN may be associated with a human skeleton model having a first number of nodes. The second GCN may be associated with a human skeleton model having a second number of nodes. The second number of nodes may be less than the first number of nodes. The first pyramid layer and the second pyramid layer may be arranged as a spatio-temporal feature pyramid graph convolutional network (ST-FP-GCN).

According to one aspect, a system for action prediction may include a first pyramid layer, a second pyramid layer, a third pyramid layer, and an output summation operator. The first pyramid layer may include a first graph convolution network (GCN). The second pyramid layer may include a second GCN. The third pyramid layer may include a third GCN. The first pyramid layer may receive an image sequence and a pose sequence and may fuse information associated with the image sequence with information associated with the pose sequence to generate a fusion output. The first pyramid layer may be associated with a model having a first number of nodes and may generate a first pyramid layer output. The second pyramid layer may be associated with a second model having a second number of nodes and may generate a second pyramid layer output. The third pyramid layer may be associated with a third model having a third number of nodes and may generate a third pyramid layer output. The output summation operator may sum the first pyramid layer output, the second pyramid layer output, and the third pyramid layer output to generate an output indicative of an action prediction for the image sequence and the pose sequence.

The first pyramid layer, the second pyramid layer, and the third pyramid layer may be arranged as a spatio-temporal feature pyramid graph convolutional network (ST-FP-GCN). A fusion gate of the first pyramid layer may fuse information associated with the image sequence with information associated with the pose sequence to generate the fusion output. The first pyramid layer may include an object recognition convolutional network. The object recognition convolutional network may be a visual geometry group (VGG) network. The second number of nodes may be less than the first number of nodes and the third number of nodes may be less than the second number of nodes.

According to one aspect, a system for action prediction may include a first pyramid layer, a second pyramid layer, and an output summation operator. The first pyramid layer may include a first graph convolution network (GCN), a fusion gate, and a first long-short-term-memory (LSTM) gate. The second pyramid layer may include a first convolution operator, a first summation operator, a first mask pool operator, a second GCN, a first upsampling operator, and a second LSTM gate. The fusion gate may receive an image sequence and a pose sequence and fuse information associated with the image sequence with information associated with the pose sequence to generate a fusion gate output. The fusion gate output may be fed to the first LSTM gate to generate a first LSTM output and the pose sequence is fed to the first GCN to generate a first GCN output feature. The first GCN output feature may be fed to the first convolution operator to generate a first convolution output feature and to the first mask pool operator to generate a first mask pool output feature. The first mask pool output feature may be fed to the second GCN to generate a second GCN output feature. The second GCN output feature may be fed to the first upsampling operator to generate a first upsampling output feature and to the second LSTM gate to generate a second LSTM output. The first convolution output feature and the first upsampling output feature may be summed by the first summation operator to generate a second layer output. The output summation operator may sum the first LSTM output and the second LSTM output to generate an output indicative of an action prediction for the image sequence and the pose sequence.

The first pyramid layer and the second pyramid layer may be arranged as a spatio-temporal feature pyramid graph convolutional network (ST-FP-GCN). The fusion gate may fuse information associated with the image sequence with information associated with the pose sequence to generate the fusion gate output based on the second layer output. The first pyramid layer includes an object recognition convolutional network. The object recognition convolutional network may be a visual geometry group (VGG) network. The first pyramid layer may be associated with a human skeleton model having a first number of nodes. The second pyramid layer may be associated with a human skeleton model having a second number of nodes. The second number of nodes may be less than the first number of nodes. During a training phase, the first LSTM output of the first LSTM may represent a first loss and the second LSTM output of the second LSTM may represent a second loss. A first weight associated with the first GCN may be adjusted based on the first loss and a second weight associated with the second GCN may be adjusted based on the second loss. The first convolution operator may perform a 1×1 convolution function.

According to one aspect, a method for action prediction may include receiving an image sequence and a pose sequence and fusing information associated with the image sequence with information associated with the pose sequence to generate a fusion gate output, feeding the fusion gate output to a first long-short-term-memory (LSTM) gate to generate a first LSTM output, feeding the pose sequence to a first graph convolution network (GCN) to generate a first GCN output feature, feeding the first GCN output feature to a first convolution operator to generate a first convolution output feature, feeding the first GCN output feature to a first mask pool operator to generate a first mask pool output feature, feeding the first mask pool output feature to a second GCN to generate a second GCN output feature, feeding the second GCN output feature to a first upsampling operator to generate a first upsampling output feature, feeding the second GCN output feature to a second LSTM gate to generate a second LSTM output, summing the first convolution output feature and the first upsampling output to generate a second layer output, summing the first LSTM output and the second LSTM output to generate an output indicative of an action prediction for the image sequence and the pose sequence.

The method for action prediction may include generating the fusion gate output based on the second layer output. The first GCN may be associated with a human skeleton model having a first number of nodes. The second GCN may be associated with a human skeleton model having a second number of nodes. The second number of nodes may be less than the first number of nodes.

According to one aspect, a system for action prediction may include a first pyramid layer, a second pyramid layer, a third pyramid layer, and an output summation operator. The first pyramid layer may include a first graph convolution network (GCN), a fusion gate, and a first long-short-term-memory (LSTM) gate. The second pyramid layer may include a first convolution operator, a first summation operator, a first mask pool operator, a second GCN, a first upsampling operator, and a second LSTM gate. The third pyramid layer may include a second convolution operator, a second summation operator, a second mask pool operator, a third GCN, a second upsampling operator, and a third LSTM gate. The fusion gate may receive an image sequence and a pose sequence and fuses information associated with the image sequence with information associated with the pose sequence to generate a fusion gate output. The fusion gate output may be fed to the first LSTM gate to generate a first LSTM output and the pose sequence may be fed to the first GCN to generate a first GCN output feature. The first GCN output feature may be fed to the first convolution operator to generate a first convolution output feature and to the first mask pool operator to generate a first mask pool output feature. The first mask pool output feature may be fed to the second GCN to generate a second GCN output feature and to the second LSTM gate to generate a second LSTM output. The second GCN output feature may be fed to the second convolution operator to generate a second convolution output feature and to second mask pool operator to generate a second mask pool output feature. The second mask pool output feature may be fed to the third GCN to generate a third GCN output feature and to the third LSTM gate to generate a third LSTM output. The third GCN output feature may be fed to the second upsampling operator to generate a second upsampling output feature. The second convolution output feature and the second upsampling output feature may be summed by the second summation operator to generate a third layer output. The third layer output may be fed to the first upsampling operator to generate the first upsampling output feature. The first convolution output feature and the first upsampling output feature may be summed by the first summation operator to generate a second layer output. The output summation operator may sum the first LSTM output, the second LSTM output, and the third LSTM output to generate an output indicative of an action prediction for the image sequence and the pose sequence.

The first pyramid layer, the second pyramid layer, and the third pyramid layer may be arranged as a spatio-temporal feature pyramid graph convolutional network (ST-FP-GCN). The fusion gate may fuse information associated with the image sequence with information associated with the pose sequence to generate the fusion gate output based on the second layer output. The first pyramid layer may be associated with a human skeleton model having a first number of nodes. The second pyramid layer may be associated with a human skeleton model having a second number of nodes. The third pyramid layer may be associated with a human skeleton model having a third number of nodes. The second number of nodes may be less than the first number of nodes and the third number of nodes may be less than the second number of nodes.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

As used herein, a feature pyramid graph convolution network may be referred to as a FP-GCN, spatio-temporal pyramid graph convolution may be ST-PGC, rapid entire body assessment may be REBA, spatio-temporal feature pyramid graph convolutional network may be ST-FP-GCN, group average pool may be GAP, and long-short-term-memory may be LSTM.

Figure 1:
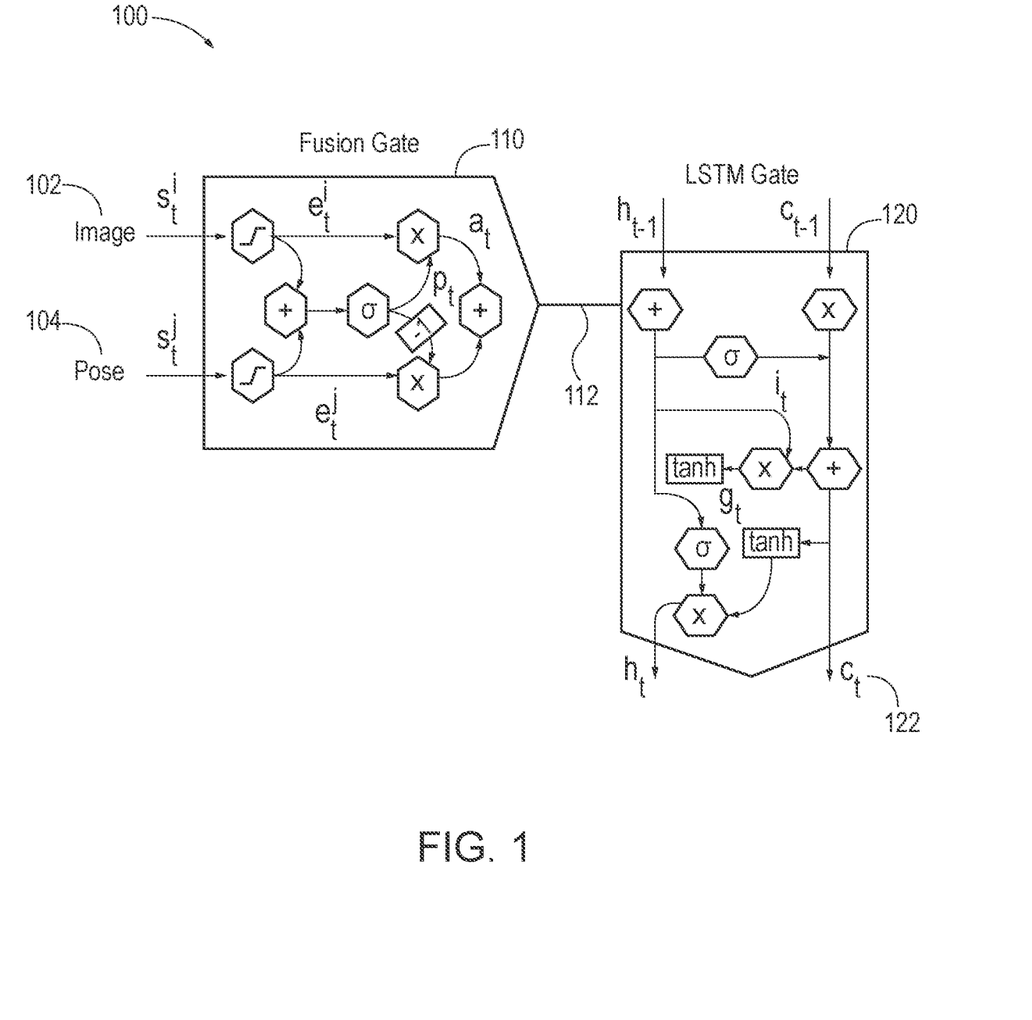
FIG. 1 is an exemplary component diagram of a system for action prediction, according to one aspect.

FIG. 1 is an exemplary component diagram of a system 100 for action prediction, according to one aspect. The first pyramid layer 202 may receive inputs 102, 104 via a first fusion gate 110, which fuses information from the inputs 102, 104 together and feeds the fused information or a fusion gate output 112 to a first LSTM gate 120, which produces an output 122.

Figure 2:
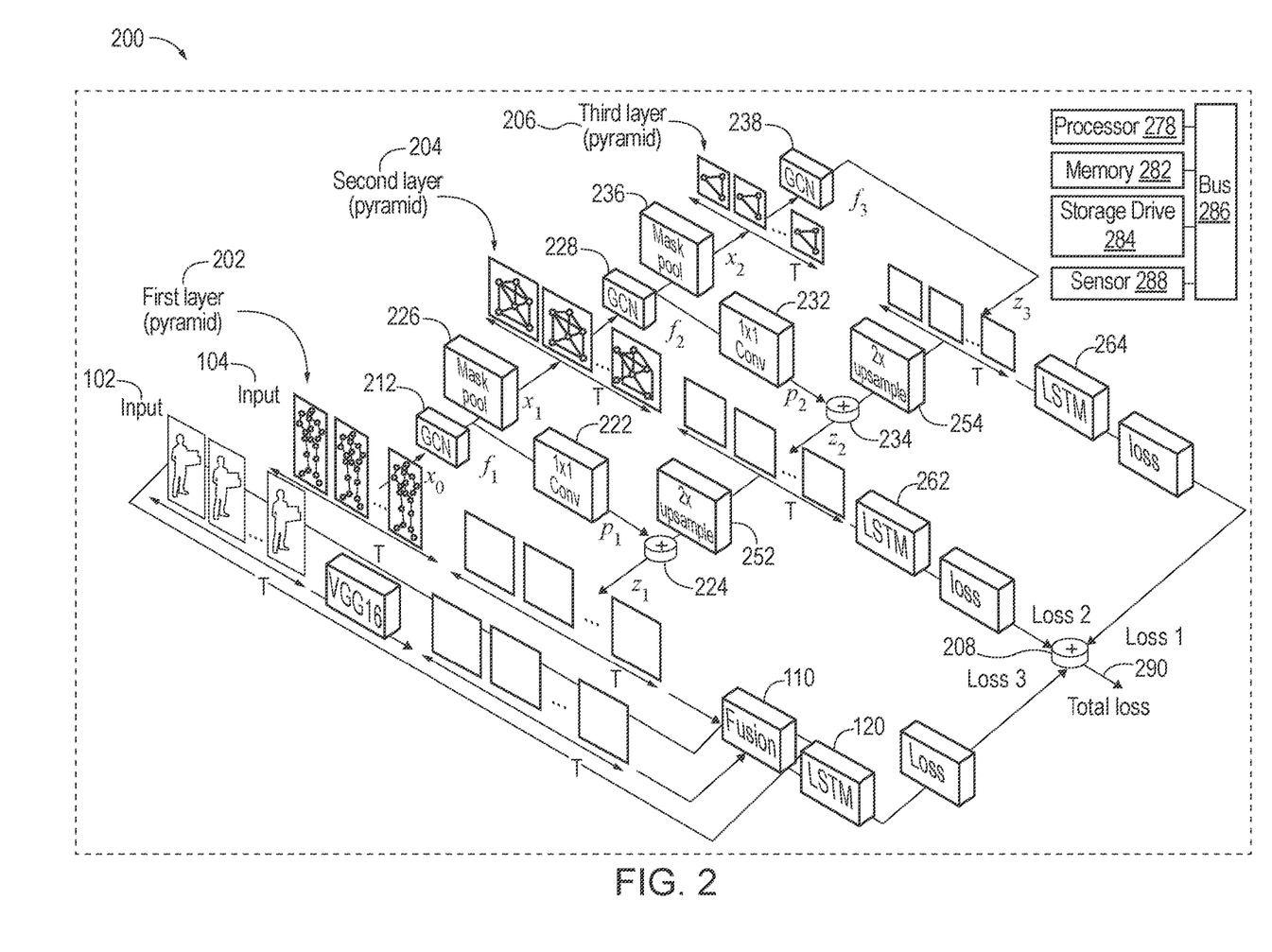
FIG. 2 is an exemplary component diagram of a system for action prediction, according to one aspect.

FIG. 2 is an exemplary component diagram of a system 200 for action prediction, according to one aspect. The system 200 for action prediction may include a first pyramid layer 202, a second pyramid layer 204, a third pyramid layer 206, and an output summation operator 208. The system 200 for action prediction may arranged as a ST-FP-GCN where each one of the first pyramid layer 202, the second pyramid layer 204, the third pyramid layer 206, etc. may be associated with different levels of semantic meaning from a low level to a high level. For example, the first pyramid layer 202 may be associated with a human skeleton model having a first number of nodes, the second pyramid layer 204 may be associated with a human skeleton model having a second number of nodes, and the third pyramid layer 206 may be associated with a human skeleton model having a third number of nodes. In this way, skeleton-based action recognition may be implemented using GCNs, which may extract features from the skeleton model.

ST-FP-GCN may model the spatial features of the data using FP-GCN. FP-GCN may be utilized to represent non-Euclidean data such as graphs and introduce a new way of representing human pose in action recognition problems. FP-GCN provides a hierarchy of feature representation that may be used as the inputs of three LSTM gates to learn the temporal aspect of the input sequences. Therefore, there may be a same number of prediction as the number of levels in the FP-GCN.

Nodes of the GCNs may represent joints of the human body while edges of the GCNs may represent limbs or body portions of the human, for example. Because ST-FP-GCN may be built from low level layers (e.g., the first pyramid layer 202) to high level layers (e.g., the third pyramid layer 206), each successive layer may be associated with less nodes. In other words, the second number of nodes may be less than the first number of nodes and the third number of nodes may be less than the second number of nodes. In this way, the first GCN 212 may be associated with a human skeleton model having many nodes representing the joints of the human body and having the highest resolution of the pyramid layers, the second GCN 228 may be associated with a human skeleton model having fewer nodes representing fewer joints of the human body, and the third GCN 238 may be associated with a human skeleton model having even fewer nodes representing mere portions the human body. Skeletal information may be utilized to construct the graph structure and node features.

Generally, the GCNs may provide an indication of how a joint moves relative to another connected joint. By modeling the second GCN 228 and the third GCN 238 with fewer nodes than the first GCN 212, analysis or an understanding of how portions of the body move with respect to other portions of the body may be performed. Stated another way, the first pyramid layer 202, the second pyramid layer 204, and the third pyramid layer 206 (or the first GCN 212, the second GCN 228, and the third GCN 238) are modeled at multiple scales or different resolutions.

The first pyramid layer 202 may include a first GCN 212, the fusion gate 110, and the first LSTM gate 120. Additionally, the first pyramid layer 202 may include an object recognition convolutional network, such as a visual geometry group (VGG) network (e.g., VGG16 network). The second pyramid layer 204 may include a first convolution operator 222, a first summation operator 224, a first mask pool operator 226, a second GCN 228, a first upsampling operator 252, and a second LSTM gate 262. The third pyramid layer 206 may include a second convolution operator 232, a second summation operator 234, a second mask pool operator 236, a third GCN 238, a second upsampling operator 254, and a third LSTM gate 264. The first convolution operator 222 and the second convolution operator 232 may perform a 1×1 convolution function.

Generally, GCNs learn the layer-wise propagation operation that may be applied on structured data represented by a graph. Assuming an undirected graph with N nodes, a set of edges between nodes, an adjacency matrix $A \in R^{N \times N}$, and a degree matrix $D_{ii}=\Sigma_j A_{ij}$. If $E \in R^{f \times N}$ represents the feature matrix of the graph ($f_i^{in} \in R^f$ may be the feature vector of node i), a linear formulation of graph convolution is:

$$f^{out}=\hat{D}^{-1/2}\hat{A}\hat{D}^{-1/2}f^{inT}W \qquad \text{(Eq. 1)}$$

where $\hat{A}=A+I$, I is the identity matrix and $W \in R^{f \times c}$ is the weight matrix. If the input to a GCN layer is f×N, the output is N×c. As with any other convolution layer, a stack of GCNs may each be followed by a non-linear function (e.g., rectified linear unit (ReLU) or other activation function).

Following the spatial configuration partitioning introduced in ST-GCN, therefore $\hat{A}=\Sigma_a A_a$ and Eq. 1 may be written in a summation form:

$$f^{out}=\Sigma_a \hat{D}_a^{-1/2}A_a\hat{D}_a^{-1/2}f^{inT}W_a \qquad \text{(Eq. 2)}$$

Figure 4:
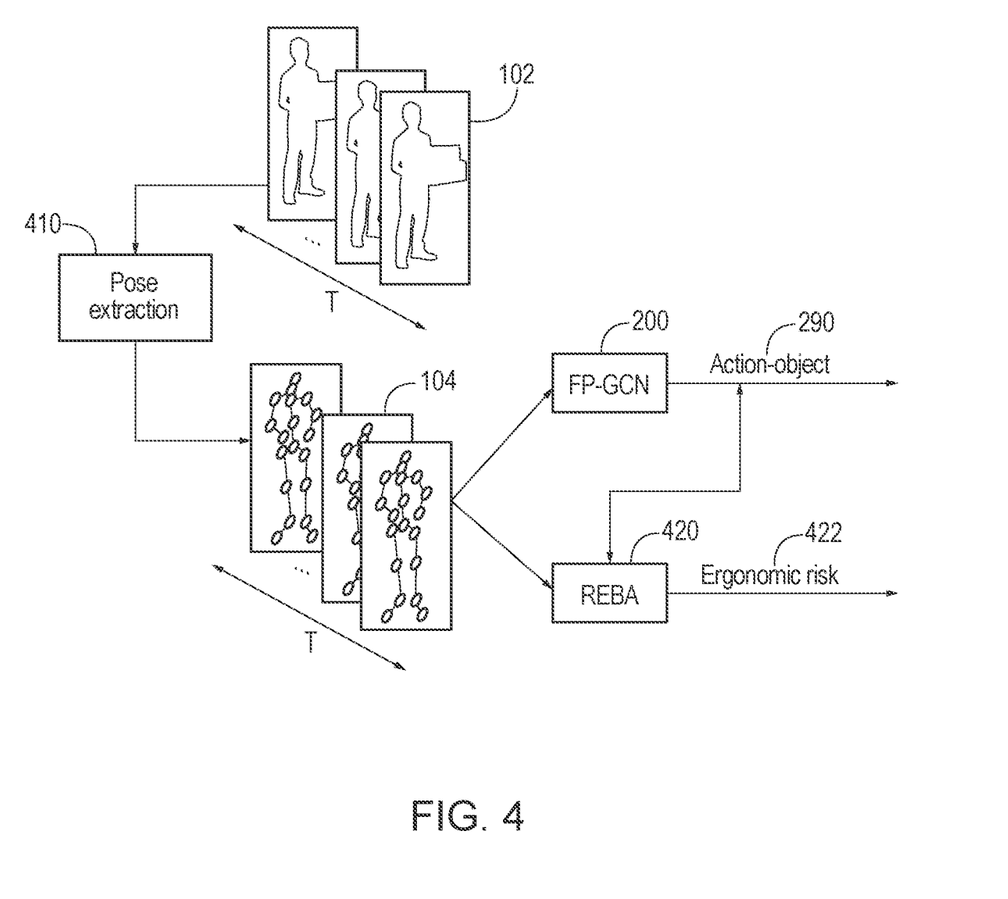
FIG. 4 is an exemplary implementation of the system for action prediction of FIG. 2, according to one aspect.

The input to the ST-FP-GCN may be the skeleton with N joints each represented by a feature vector ($f_i^{in}$). After aggregating features using the GCN (Eq. 2), a pooling mechanism may be implemented to average features from a pre-defined sets of joints to determine features representing specific body parts. As seen in FIG. 4, a model including a hierarchy of graphs with the base as the input skeleton and the top level being a graph with three nodes representing right arm and leg, left arm and leg, and the head and spine may be utilized. This hierarchy of graphs may become smaller while moving toward the top level (e.g., hierarchical graph pyramid or bottom up pathway).

GAP may layer average-pool features in a selected group of nodes or joints and produce a node that represents a higher level body part. Therefore, every layer of the pyramid may have a semantic meaning, from low level to high level. In an exemplary grouping shown in FIG. 4, groups may be predefined.

The fusion gate 110 may receive an image sequence 102 and a pose sequence 104 and fuses information associated with the image sequence 102 with information associated with the pose sequence 104 to generate a fusion gate output or fusion output, thereby utilizing a two-stream input (i.e., the image sequence 102 for context and the pose sequence 104 for ergonomics) for the system 200 for action prediction. Effectively, the fusion gate 110 may combine image feature information with pose feature information (e.g., relating to posture of an individual) as an input to the first LSTM gate 120, which may model the fused information of the fusion gate output in a temporal fashion. According to one aspect, the image sequence 102 and the pose sequence 104 may be received from an image sensor. Thus, this model may fuse the object or context features along with pose dynamics.

The image sequence 102 may include image information, texture information, feature information, etc. associated with an environment around the individual. In this way, the image sequence 102 information may include scene context features, object handling features (e.g., walking on a crosswalk versus walking indoors may have different contexts or meanings, lifting a box versus lifting a rod), etc. The pose sequence 104 may include pose or posture information associated with the individual including a model based on joint locations of the individual. As previously discussed, the first pyramid layer 202 may include the VGG16 network. The image sequence 102 may be fed through the VGG16 network to extract image features. Local label transitions may be captured via feature modeling and not necessarily entirely via temporal modeling.

The fusion gate output may be fed to the first LSTM gate 120 to generate a first LSTM output (e.g., a type of first pyramid layer output) and the pose sequence 104 may be fed to the first GCN 212 to generate a first GCN output feature. The first GCN output feature may be fed to the first convolution operator 222 to generate a first convolution output feature and to the first mask pool operator 226 to generate a first mask pool output feature. The first mask pool output feature may be fed to the second GCN 228 to generate a second GCN output feature and to the second LSTM gate 262 to generate a second LSTM output (e.g., a type of second pyramid layer output). In this way, spatio-temporal graph convolution may enhance this by applying convolutions over spatial domain and temporal convolutions over the time domain in a sequential manner.

The second GCN output feature may be fed to the second convolution operator 232 to generate a second convolution output feature and to second mask pool operator 236 to generate a second mask pool output feature. The second mask pool output feature may be fed to the third GCN 238 to generate a third GCN output feature and to the third LSTM gate 264 to generate a third LSTM output. The third GCN output feature may be fed to the second upsampling operator 254 to generate a second upsampling output feature.

The second convolution output feature and the second upsampling output feature may be summed by the second summation operator 234 to generate a third layer output. The third layer output may be fed to the first upsampling operator 252 to generate the first upsampling output feature. The first convolution output feature and the first upsampling output feature may be summed by the first summation operator 224 to generate a second layer output. This second layer output may be utilized to generate the fusion gate output. In other words, the fusion gate 110 may fuse information associated with the image sequence 102 with information associated with the pose sequence 104 to generate the fusion gate output based on the second layer output.

The modeling at multiple scales or different resolutions may be achieved via the mask pool operators (e.g., the first mask pool operator 226, the second mask pool operator 236), which effectively compresses the human body model or joints into body parts or portions. Mask pooling will be described in greater detail with reference to FIG. 3 herein. Conversely, the first convolution operator 222 and the first upsampling operator 252 may enable the first summation operator 224 to perform element-wise addition on outputs for the respective components (e.g., the first convolution output feature and the first upsampling output feature) by matching dimensionality, scale, or resolution of the associated information from the respective outputs. Similarly, the second convolution operator 232 and the second upsampling operator 254 may enable the second summation operator 234 to perform element-wise addition on outputs for the respective components (e.g., the second convolution output feature and the second upsampling output feature) in a similar manner, also by matching dimensionality, scale, or resolution of the associated information from the respective outputs.

Thus, feature pyramids may be utilized for object recognition. The advantage of using feature pyramids may include producing a multi-scale feature representation in which all feature levels may be semantically strong. Further, featurizing each level of a graph pyramid helps with constructing richer features. For example, in skeleton-based action recognition, the correlation of body-parts may be very informative in recognizing actions. Different encodings of these correlations may result in features for skeleton-based action recognition. Here, generalizing the feature pyramid network to a GCN pyramidal feature hierarchy, and learning the correlations at different levels of the hierarchy may enhance the performance of the model.

With respect to FP-GCNs, consider merely a single frame from the input sequence (e.g., the image sequence 102 and the pose sequence 104). Feature pyramid networks may include two pathways: a bottom-up pathway and a top-down pathway. The bottom-up pathway may be the feed-forward computation of the backbone GCN, which may compute a feature hierarchy including feature maps at different scales. The top-down pathway may produce higher resolution features by up-sampling spatially larger, but semantically stronger, feature maps from higher pyramid levels. This new feature hierarchy may be enhanced by the features produced in the bottom-up pathway through a lateral connection. The features from the bottom-up pathway undergo a 1×1 convolutional layer to reduce channel dimensions and then may be merged into the top-down pathway features by element-wise addition.

FP-GCN may be constructed for every input frame, and modeling the dynamics of the skeleton sequence. The sequence of features at every layer of the pyramid may be given as the input to the first LSTM gate 120, which may generate frame-wise labels.

The output summation operator 208 may sum the first LSTM output, the second LSTM output, and the third LSTM output (e.g., which may be a type of third pyramid layer output) to generate an output or activity label 290 indicative of an action prediction for the image sequence 102 and the pose sequence 104, thus enabling classification of incoming pose streams. During a training phase, the first LSTM output of the first LSTM may represent a first loss, the second LSTM output of the second LSTM may represent a second loss, and the third LSTM output of the third LSTM may represent a third loss, etc. According to one aspect, a first weight associated with the first GCN 212 may be adjusted based on the first loss, a second weight associated with the second GCN 228 may be adjusted based on the second loss, a third weight associated with the third GCN 238 may be adjusted based on the third loss, etc. In this way, backpropagation may be utilized to compute gradients or weights associated with the respective GCNs with respect to a loss function during the training phase.

During an execution phase, which occurs after the training phase, the first LSTM output of the first LSTM may represent a first action estimate, the second LSTM output of the second LSTM may represent a second action estimate, and the third LSTM output of the third LSTM may represent a third action estimate, etc. Additionally, gradients or weights learned during the training phase may be implemented. Examples of action predictions may include walking, standing, bending, reaching, picking up an object, placing an object, holding an object, and associated heights for the object (e.g., low, medium, high, etc.), types of objects (e.g., box, rod, etc.).

In this way, the system of FIG. 2 may include feature pyramid layers which may take sequences of graphs representing human poses and aggregates those features using GCNS, then mask average pooling those features from predefined sets for graph nodes, resulting in a new graph representing a body part (e.g., the bottom-up pathway discussed above).

Although FIG. 2 is described with respect to the first pyramid layer 202, the second pyramid layer 204, and the third pyramid layer 206, a fewer number of layers may be implemented, such as two pyramid layers. Additional pyramid layers, such as four pyramid layers, may also be implemented. In this regard, merely two GCNs may be utilized according to some aspects, which results in far fewer parameters than other existing architectures.

Additionally, the system 200 for action prediction of FIG. 2 may include a processor 378, a memory 282, a storage drive 284, a bus 286, and a sensor 288. The sensor 288 may be an image capture sensor receiving the image sequence 102 which may be analyzed and broken down into the pose sequence 104. Any of the components of the first pyramid layer 202, the second pyramid layer 204, and the third pyramid layer 206 may be implemented via the processor 278, the memory 282, and the storage drive 284. For example, GCNs 212, 228, 238 may be implemented via the processor 278, the memory 282, and the storage drive 284. Similarly, the LSTM gates 120, 262, 264 may be implemented via the processor 278, the memory 282, and the storage drive 284, etc.

Figure 3:
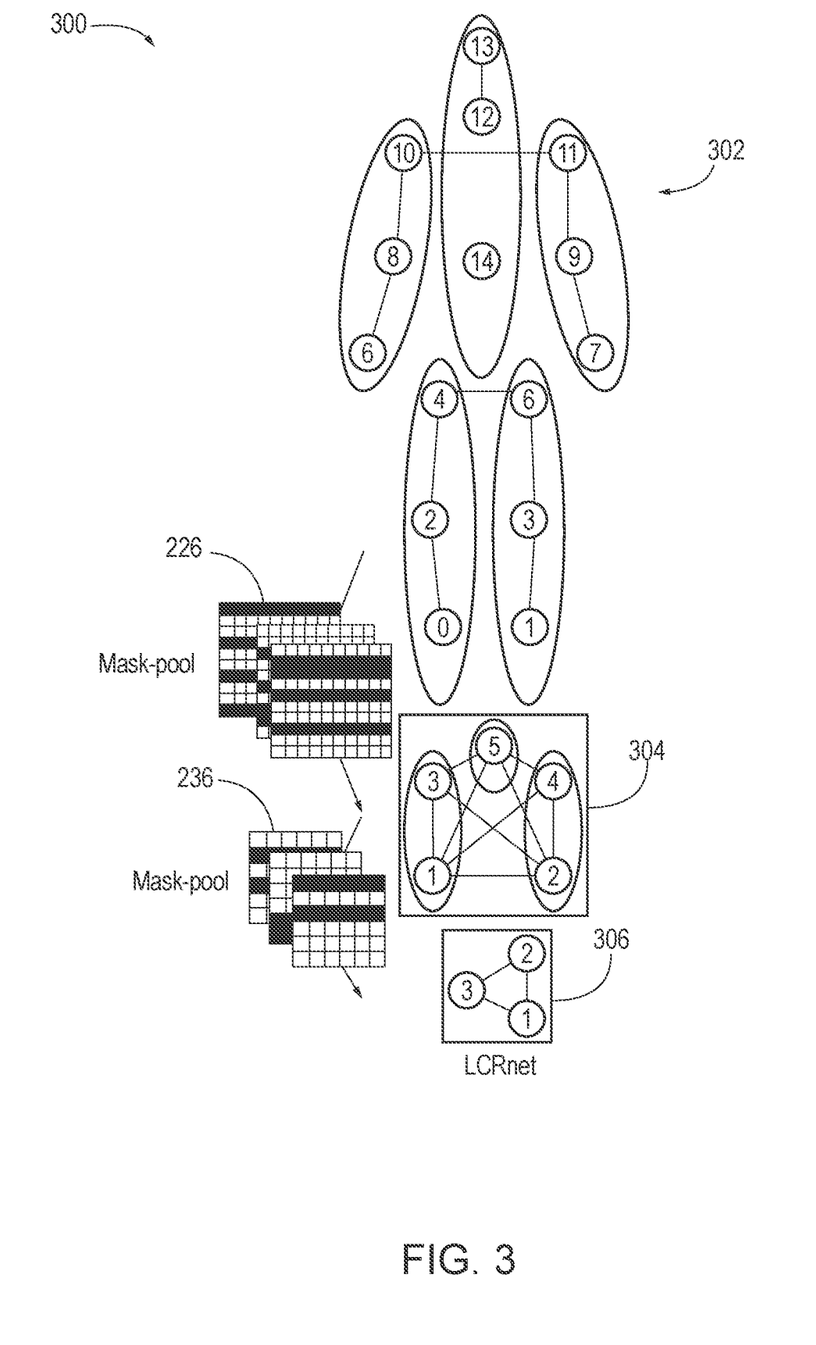
FIG. 3 is an exemplary model of a human skeleton in association with the component diagram of the system for action prediction of FIG. 2, according to one aspect.

FIG. 3 is an exemplary model 300 of a human skeleton in association with the component diagram of the system 200 for action prediction of FIG. 2, according to one aspect. A first model 302 may be associated with 15 nodes (e.g., nodes 0-14), a second model 304 may be associated with fewer nodes, such as merely five nodes because mask-pool 226 has reduced or combined nodes from the first model 302 into a single node within the second model 304. For example, nodes 6, 8, 10 from the first model 302 may be combined to form node 3 in the second model 304 or nodes 12, 13, 14 from the first model 302 may be combined by the mask-pool 226 to form node 5 in the second model 304, etc. The third model 306 may further reduce the nodes of the second model 340 using mask-pool 236 in a similar fashion.

FIG. 4 is an exemplary implementation of the system 200 for action prediction of FIG. 2, according to one aspect. An automated Rapid Entire Body Assessment (REBA) ergonomic risk measure 420 may be implemented, leveraging from the ST-PGC recognition result. Among the postural evaluation methods, REBA may be used. The REBA model assigns scores to human poses, based on joint angles during an activity. First a risk score may be computed for upper and lower body parts and those scores may be added to the task related scores such as coupling and load. According to one aspect, the system may compute REBA frame-wise scores and use the recognition predictions to adjust the scores based on the determined task. For example, the image sequence 102 102 may be processed and pose extraction 104 may be performed by a pose extractor 410 (e.g., using LCR-Net, a Localization-Classification-Regression for Human Pose). These sequences may be fed to the FP-GCN 200 and the output of the LSTM gates may be averaged. The activity label or output 290 associated with the action prediction may be fed to a REBA module 420 to automatically assess any ergonomic scores 422.

Figure 5:
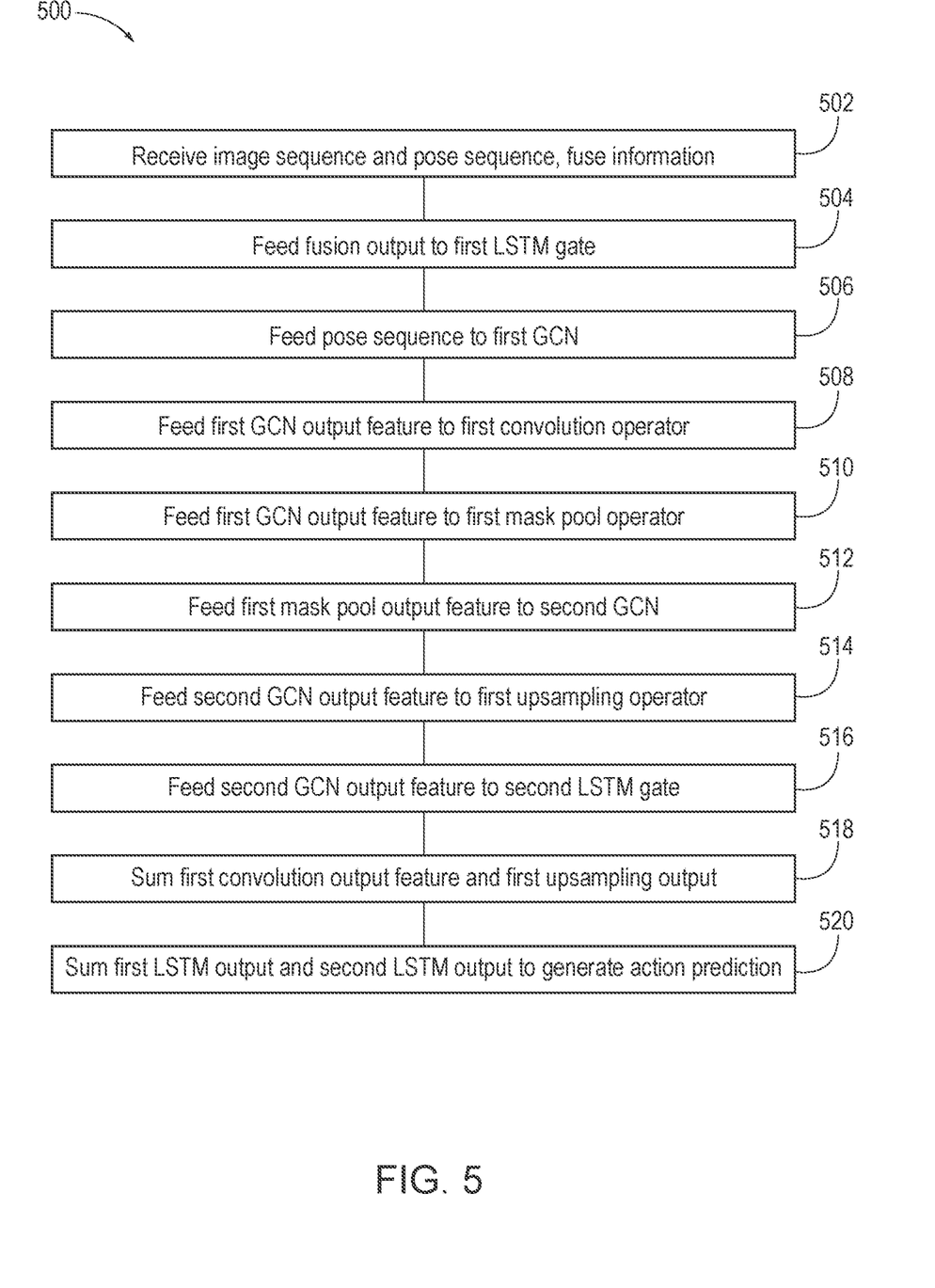
FIG. 5 is an exemplary flow diagram of a method for action prediction, according to one aspect.

FIG. 5 is an exemplary flow diagram of a method 500 for action prediction, according to one aspect. The method for action prediction may include receiving 502 an image sequence 102 and a pose sequence 104 and fusing information associated with the image sequence 102 with information associated with the pose sequence 104 to generate a fusion gate output, feeding 504 the fusion gate output to a first LSTM gate 120 to generate a first LSTM output, feeding 506 the pose sequence 104 to a first GCN 212 to generate a first GCN output feature, feeding 508 the first GCN output feature to a first convolution operator 222 to generate a first convolution output feature, feeding 510 the first GCN output feature to a first mask pool operator 226 to generate a first mask pool output feature, feeding 512 the first mask pool output feature to a second GCN 228 to generate a second GCN output feature, feeding 514 the second GCN output feature to a first upsampling operator 252 to generate a first upsampling output feature, feeding 516 the second GCN output feature to a second LSTM gate 262 to generate a second LSTM output, summing 518 the first convolution output feature and the first upsampling output to generate a second layer output, and summing 520 the first LSTM output and the second LSTM output to generate an output 290 indicative of an action prediction for the image sequence 102 and the pose sequence 104.

Figure 6:
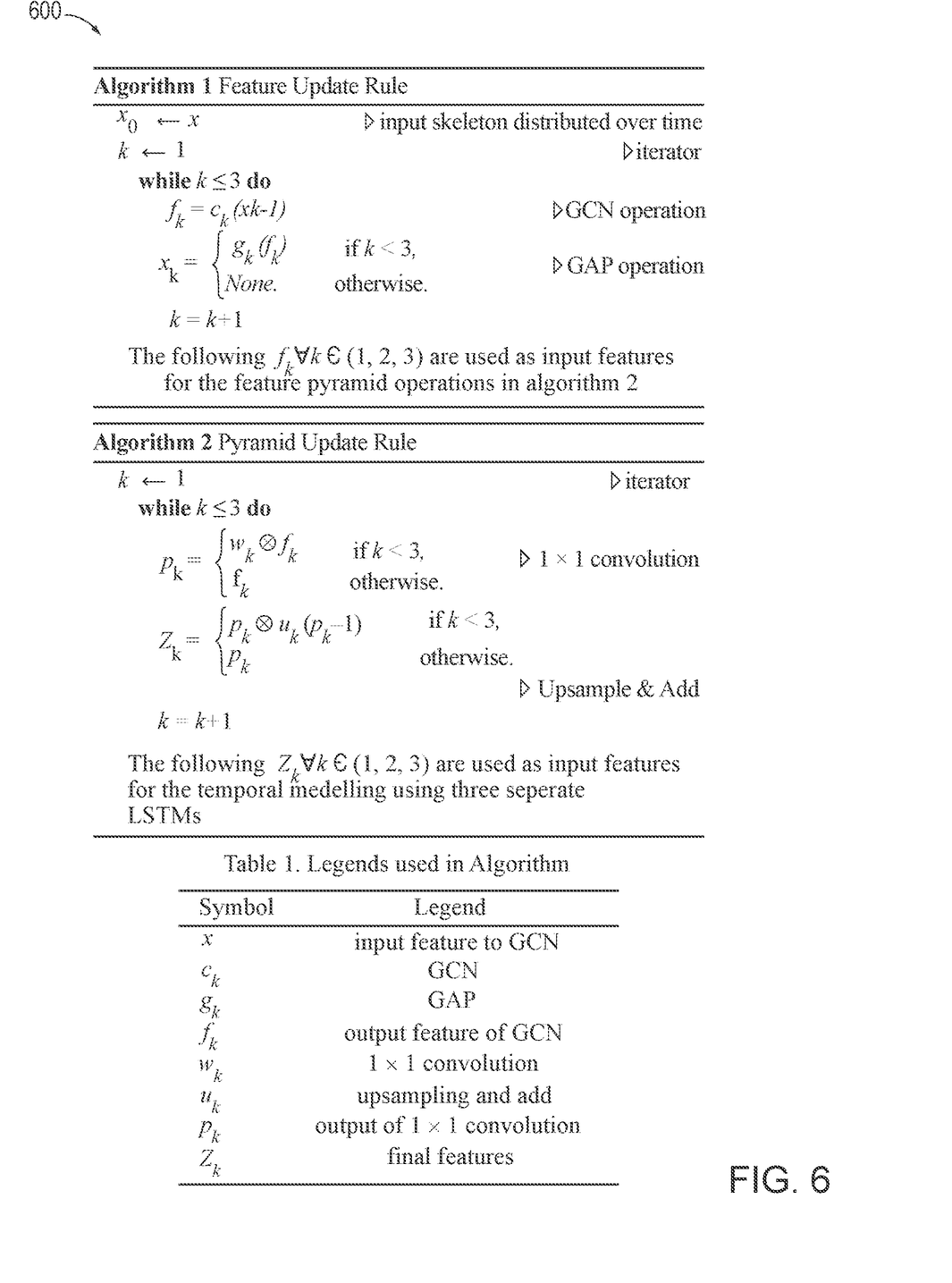
FIG. 6 is an exemplary flow diagram of a method for action prediction, according to one aspect.

FIG. 6 is an exemplary flow diagram of a method for action prediction, according to one aspect. As seen in FIG. 6, exemplary pseudocode 600 for action prediction is provided.

Figure 7:
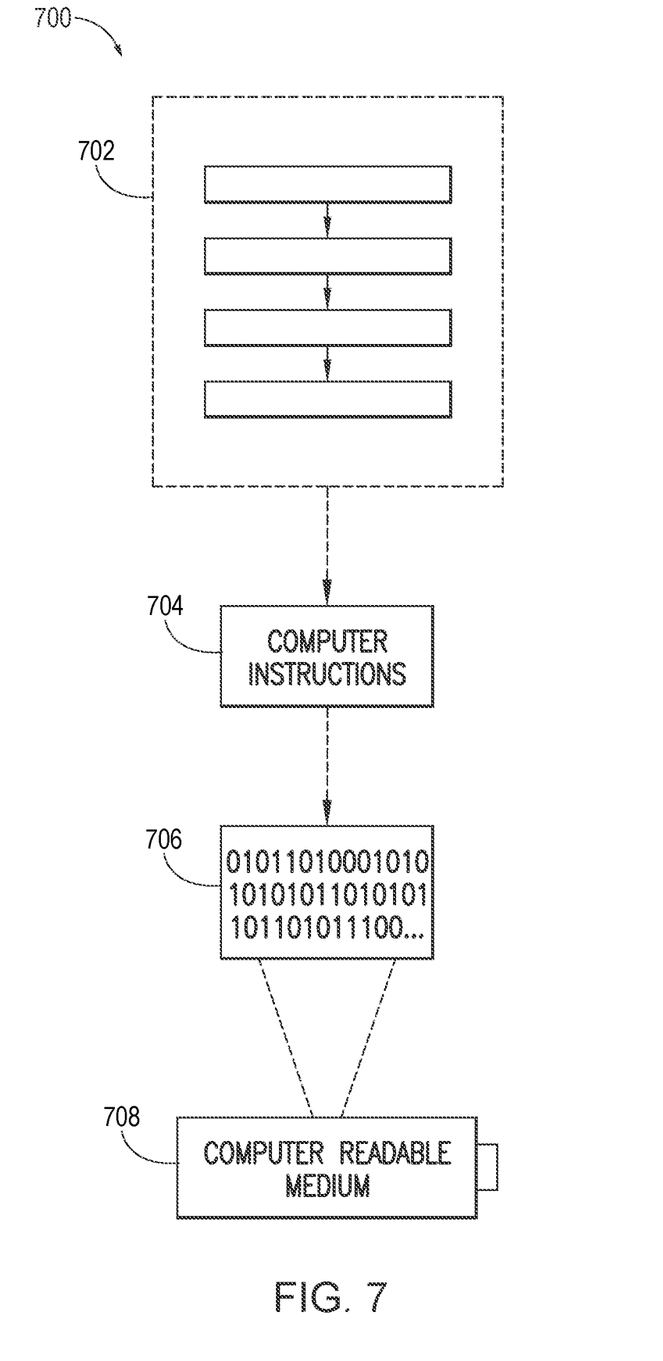
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 500 of FIG. 5 or the method 600 of FIG. 6. In another aspect, the processor-executable computer instructions 704 may be configured to implement a system, such as the system 100 of FIG. 1 or the system 200 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
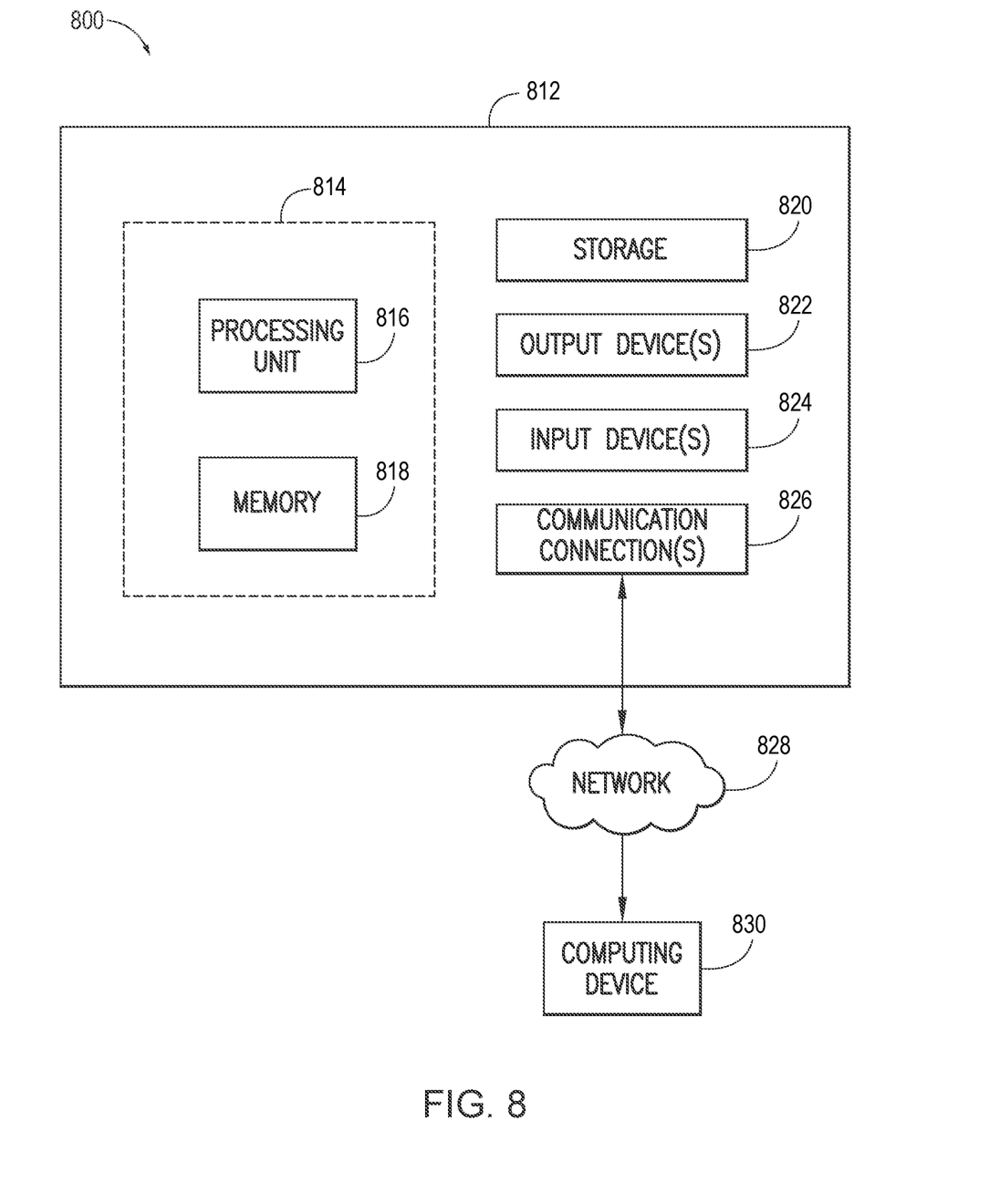
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, the computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other aspects, the computing device 812 includes additional features or functionality. For example, the computing device 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 812. Any such computer storage media is part of the computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with the computing device 812. Input device(s) 824 and output device(s) 822 may be connected to the computing device 812 via a wired connection, wireless connection, or any combination thereof. In one aspect, an input device or an output device from another computing device may be used as input device(s) 824 or output device(s) 822 for the computing device 812. The computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for action prediction, comprising:
a first pyramid layer including a first graph convolution network (GCN);
a second pyramid layer including a second GCN; and
an output summation operator,
wherein the first pyramid layer receives an image sequence and a pose sequence and fuses information associated with the image sequence with information associated with the pose sequence to generate a fusion output,
wherein the first pyramid layer is associated with a model having a first number of nodes and generates a first pyramid layer output,
wherein the second pyramid layer is associated with a second model having a second number of nodes and generates a second pyramid layer output, wherein the output summation operator sums the first pyramid layer output and the second pyramid layer output to generate an output indicative of an action prediction for the image sequence and the pose sequence.

2. The system for action prediction of claim 1, wherein the first pyramid layer and the second pyramid layer are arranged as a spatio-temporal feature pyramid graph convolutional network (ST-FP-GCN).

3. The system for action prediction of claim 1, wherein a fusion gate of the first pyramid layer fuses information associated with the image sequence with information associated with the pose sequence to generate the fusion output.

4. The system for action prediction of claim 1, wherein the first pyramid layer includes an object recognition convolutional network.

5. The system for action prediction of claim 4, wherein the object recognition convolutional network is a visual geometry group (VGG) network.

6. The system for action prediction of claim 1, wherein the second number of nodes is less than the first number of nodes.

7. The system for action prediction of claim 1, wherein during a training phase, a first LSTM output of a first long-short-term-memory (LSTM) gate of the first pyramid layer represents a first loss and a second LSTM output of a second LSTM of the second pyramid layer represents a second loss.

8. The system for action prediction of claim 7, wherein a first weight associated with the first GCN is adjusted based on the first loss and a second weight associated with the second GCN is adjusted based on the second loss.

9. The system for action prediction of claim 1, wherein a first convolution operator of the second pyramid layer performs a 1×1 convolution function.

10. The system for action prediction of claim 1, wherein the model and the second model are human skeleton models.

11. A method for action prediction, comprising:
   receiving an image sequence and a pose sequence and fusing information associated with the image sequence with information associated with the pose sequence to generate a fusion gate output,
   feeding the fusion gate output to a first long-short-term-memory (LSTM) gate to generate a first LSTM output;
   feeding the pose sequence to a first graph convolution network (GCN) of a first pyramid layer to generate a first GCN output feature;
   feeding the first GCN output feature to a second GCN of a second pyramid layer to generate a second GCN output feature;
   feeding the second GCN output feature to a second LSTM gate to generate a second LSTM output; and
   summing the first LSTM output and the second LSTM output to generate an output indicative of an action prediction for the image sequence and the pose sequence.

12. The method for action prediction of claim 11, wherein the first GCN is associated with a human skeleton model having a first number of nodes.

13. The method for action prediction of claim 12, wherein the second GCN is associated with a human skeleton model having a second number of nodes, wherein the second number of nodes is less than the first number of nodes.

14. The method for action prediction of claim 11, wherein the first pyramid layer and the second pyramid layer are arranged as a spatio-temporal feature pyramid graph convolutional network (ST-FP-GCN).

15. A system for action prediction, comprising:
   a first pyramid layer including a first graph convolution network (GCN);
   a second pyramid layer including a second GCN;
   a third pyramid layer including a third GCN; and
   an output summation operator,
   wherein the first pyramid layer receives an image sequence and a pose sequence and fuses information associated with the image sequence with information associated with the pose sequence to generate a fusion output,
   wherein the first pyramid layer is associated with a model having a first number of nodes and generates a first pyramid layer output,
   wherein the second pyramid layer is associated with a second model having a second number of nodes and generates a second pyramid layer output,
   wherein the third pyramid layer is associated with a third model having a third number of nodes and generates a third pyramid layer output,
   wherein the output summation operator sums the first pyramid layer output, the second pyramid layer output, and the third pyramid layer output to generate an output indicative of an action prediction for the image sequence and the pose sequence.

16. The system for action prediction of claim 15, wherein the first pyramid layer, the second pyramid layer, and the third pyramid layer are arranged as a spatio-temporal feature pyramid graph convolutional network (ST-FP-GCN).

17. The system for action prediction of claim 15, wherein a fusion gate of the first pyramid layer fuses information associated with the image sequence with information associated with the pose sequence to generate the fusion output.

18. The system for action prediction of claim 15, wherein the first pyramid layer includes an object recognition convolutional network.

19. The system for action prediction of claim 18, wherein the object recognition convolutional network is a visual geometry group (VGG) network.

20. The system for action prediction of claim 15, wherein the second number of nodes is less than the first number of nodes and wherein the third number of nodes is less than the second number of nodes.

* * * * *